(12) United States Patent
Virvalo et al.

(10) Patent No.: US 7,017,460 B2
(45) Date of Patent: Mar. 28, 2006

(54) METHOD AND ARRANGEMENT FOR ADJUSTING FEED RATE OF A CROSSCUT SAW

(75) Inventors: Tapio Virvalo, Tampere (FI); Juha Inberg, Iisalmi (FI); Jorma Hyvönen, Iisalmi (FI)

(73) Assignee: Ponsee Oyj, Vierema (FI)

( * ) Notice: Subject to any disclaimer, the term of this patent is extended or adjusted under 35 U.S.C. 154(b) by 453 days.

(21) Appl. No.: 10/288,293

(22) Filed: Nov. 6, 2002

(65) Prior Publication Data

US 2003/0097917 A1   May 29, 2003

Related U.S. Application Data

(63) Continuation of application No. PCT/FI01/00443, filed on May 9, 2001.

(30) Foreign Application Priority Data

May 10, 2000  (FI) ................................. 20001107

(51) Int. Cl.
  *B23D 53/00*  (2006.01)
(52) U.S. Cl. ..................... 83/13; 83/74; 83/789; 83/796
(58) Field of Classification Search ..................... 83/76, 83/74, 13, 639.1, 72, 796, 801, 639, 800, 83/794, 574, 928, 795, 789, 765; 144/34.1, 144/356

See application file for complete search history.

(56) References Cited

U.S. PATENT DOCUMENTS

| | | | | |
|---|---|---|---|---|
| 3,642,041 A | * | 2/1972 | Hamilton et al. ............ 144/338 |
| 3,937,114 A | * | 2/1976 | Joensson et al. ............ 83/425.2 |
| 4,083,291 A | * | 4/1978 | Larsson ........................ 91/517 |
| 4,283,975 A | * | 8/1981 | Knoll ............................. 83/76 |
| 4,358,974 A | * | 11/1982 | Sakurai ........................ 83/13 |
| 4,432,260 A | * | 2/1984 | Sarurai et al. ................. 83/13 |
| 4,722,258 A | * | 2/1988 | Johnson ........................ 83/72 |
| 4,901,612 A | * | 2/1990 | Harris ........................... 83/56 |
| 4,942,795 A | * | 7/1990 | Linke et al. ................... 83/72 |
| 5,043,907 A | * | 8/1991 | Richards ..................... 700/167 |
| 5,115,403 A | * | 5/1992 | Yoneda et al. .............. 700/173 |
| 5,142,955 A | * | 9/1992 | Hale .......................... 83/75.5 |
| 5,784,883 A | * | 7/1998 | Ohkura et al. ................ 60/327 |
| 6,041,683 A | * | 3/2000 | Timperi et al. ................ 83/76 |

(Continued)

FOREIGN PATENT DOCUMENTS

CA  1 191 952  8/1985

(Continued)

*Primary Examiner*—Allan N. Shoap
*Assistant Examiner*—Ghassem Alie
(74) *Attorney, Agent, or Firm*—Young & Thompson

(57) ABSTRACT

A method and arrangement for adjusting a feed rate of a crosscut saw (1), in particular, in a harvesting head of a forest machine during the crosscutting of wood (9) in the apparatus. A feed force (F) of the crosscut saw and/or a rotating rate ($v_{chain}$) of a cutter chain (5) revolving around a guide bar (4) are thus controlled. The control is implemented such that first the feed rate ($v_{feed}$) of the crosscut saw (1) is measured at given intervals. By adjusting thereafter the feed force of the actuator (2) controlling the crosscut saw and/or the rotating rate ($v_{chain}$) of the cutter chain (5) and by determining the effect of the performed adjustment on the feed rate of the crosscut saw any change ($\delta v$) in the feed rate and the most advantageous adjustment measure to be performed next is concluded.

20 Claims, 1 Drawing Sheet

U.S. PATENT DOCUMENTS

| | | | |
|---|---|---|---|
| 6,158,322 A * | 12/2000 | Ornberg | 83/796 |
| 6,167,324 A * | 12/2000 | Gorman | 700/171 |
| 6,397,452 B1 * | 6/2002 | Frosberg et al. | 29/505 |
| 2002/0020266 A1 * | 2/2002 | Smith | 83/75 |

FOREIGN PATENT DOCUMENTS

| | | |
|---|---|---|
| FI | 102236 B | 11/1998 |
| WO | 99/12410 | 3/1999 |

* cited by examiner

METHOD AND ARRANGEMENT FOR ADJUSTING FEED RATE OF A CROSSCUT SAW

CROSS REFERENCE TO RELATED APPLICATION

This application is a Continuation of International Application PCT/FI01/00443 filed on May 9, 2001, which designated the U.S. and was published under PCT Article 21(2) in English.

FIELD OF THE INVENTION

The invention relates to a method for adjusting a feed rate of a crosscut saw, in particular, as a tree trunk is handled in a harvesting head of a forest machine.

The invention also relates to an arrangement for executing this method.

Thus, the invention particularly relates to a feed rate adjustment system of a crosscut saw of the harvesting head, i.e. so-called one-grip harvester.

BACKGROUND OF THE INVENTION

Harvesting heads of multi-function machines currently employed in timber harvesting have a crosscut saw for felling and crosscutting timber. The crosscut saw conventionally comprises a so-called chain saw provided with a chain of cutters revolving round a guide bar. In felling, a tree trunk is gripped by a harvesting head, whereafter the trunk is cut by applying the crosscut saw against it. The cutter chain of the crosscut saw is generally driven by a power device, such as a hydraulic motor, activated by pressure medium. As the crosscut saw is applied against the trunk, the guide bar with its cutter chain is turned against the trunk also by means of pressure medium, for instance, by a hydraulic cylinder. Thereafter, the felled trunk is guided against delimbing means by feeding means of the harvesting head and the delimbed tree trunk is cut to logs of desired length.

In connection with crosscutting, more and more attention is currently paid to cutting damage caused in connection with sawing so as to reduce economic losses resulting therefrom. These damages have been widely researched, for instance, by a Swedish research institute, Trätek.

To prevent damage, the feed rate of crosscut saws in harvesting heads is conventionally set to be constant. However, the feed rate must then be set so low that the crosscut saw is able to saw also trees having high sawing resistance, for instance, thick or icy trees.

Because the constant feed rate does not provide the most optimal sawing result, currently are also known crosscut saw control systems, in which a feed pressure of a pressure medium applied to a crosscut saw motor is measured for defining the sawing resistance. One of these control systems suggests to adjust the feed rate of the saw by throttling stepwise the volume flow of the pressure medium applied to the cylinder. On the other hand, arrangements are also known, in which the feed rate of the saw is adjusted by measuring the feed pressure of the pressure medium applied to the motor so as to keep the feed pressure of the crosscut saw substantially constant.

Control systems are also known, in which a crosscut saw rotating rate is measured, and the aim is to keep the speed of the cutter chain substantially constant by adjusting the feed force of the saw as the sawing resistance varies.

In all the above-mentioned inventions, the aim is to speed up the sawing by measuring either the feed pressure of the pressure medium applied to the crosscut saw motor or the rotating rate of the cutter chain. The aim of these methods is to keep the loading of the crosscut saw constant. However, previous solutions have not been able to provide any considerable improvement in the speed of the sawing event, because keeping the loading constant does not necessarily lead to an optimal result in the sawing rate.

BRIEF DESCRIPTION OF THE INVENTION

The object of the present invention is to take account of the drawbacks associated with the prior art and to provide quite a novel method which enables further speeding up of sawing and thus raising of the level of the prior art in the field.

This is achieved by the method of the invention, which is disclosed below.

This is achieved such that the method for adjusting a feed rate of a crosscut saw according to the invention has characteristics disclosed below.

The arrangement according to the invention, is disclosed below.

The method of the invention is based on the idea by which the feed rate of the crosscut saw is rendered as high as possible by monitoring and utilizing measurable variables known per se, such as feed rate of the crosscut saw. The aim is thus to adjust the feed force and rotating rate of the crosscut saw such that the total feed rate of the crosscut saw is rendered as high as possible. In this manner, it is possible to saw timber of any diameter and of any wood species. By continuously adjusting the sawing rate during the sawing by means of the method of the invention, it is also possible to avoid sudden stresses that might damage the structures of the harvesting head, and in particular those of the crosscut saw therein.

The preferred embodiments of the invention are disclosed below.

The method of the invention has an advantage that splittings, which are problematic, produced particularly during the crosscutting of a tree can be considerably reduced by performing the crosscutting as fast as possible. An advantage of the method over the previous solutions is that it provides the crosscut saw with as high feed rate as possible, and consequently the sawing time can be considerably shortened. The utilization of the method is not restricted in any way whatsoever to any particular wood species, to any wood of a particular diameter or to any other characteristic of a single tree or wood species.

The adjustment of the crosscut saw provided by the invention is also independent of the condition and type of the cutter chain of the crosscut saw, as well as of the environmental conditions, such as a temperature and humidity of wood to be cut.

When necessary, the method and the arrangement based thereon makes it possible to focus the raised cutting power to the final stage of crosscutting the tree trunk. As a consequence, the total power need of the crosscut saw can be limited and the efficiency of a wood handling machine can be improved.

By adjusting the sawing on a continuous basis, the operating costs incurred in sawing will reduce, because components subjected to hard stress, such as the guide bar, the cutter chain and the power source, break less often thanks to steadier movements provided for the saw.

Sawing equipment control achieved by the invention is more efficient than previously known control procedures. Raising the sawing power, in particular at the final stage of crosscutting the tree trunk, does not only shorten the total sawing time but it also advantageously reduces splittings in the logs. Hence, it is possible to reduce substantially the number of longitudinal splittings, which generally reduce the value of the log by as much as 2.5%.

The method and arrangement of the invention are based on the utilization of reliable electronics and information technology employed currently in all the wood handling machines. Because this technology already exists in advanced machines, its adoption does not considerably increase the final price of the wood handling machine.

BRIEF DESCRIPTION OF THE DRAWINGS

In the following, the invention will be described in greater detail, by using as an example a harvesting head attachable to a work machine employed as a harvesting machine, such as a multi-function harvester, to which harvesting head the invention can be applied. Reference is made to the attached drawing, wherein.

DETAILED DESCRIPTION OF THE PREFERRED EMBODIMENT

Figure 1:
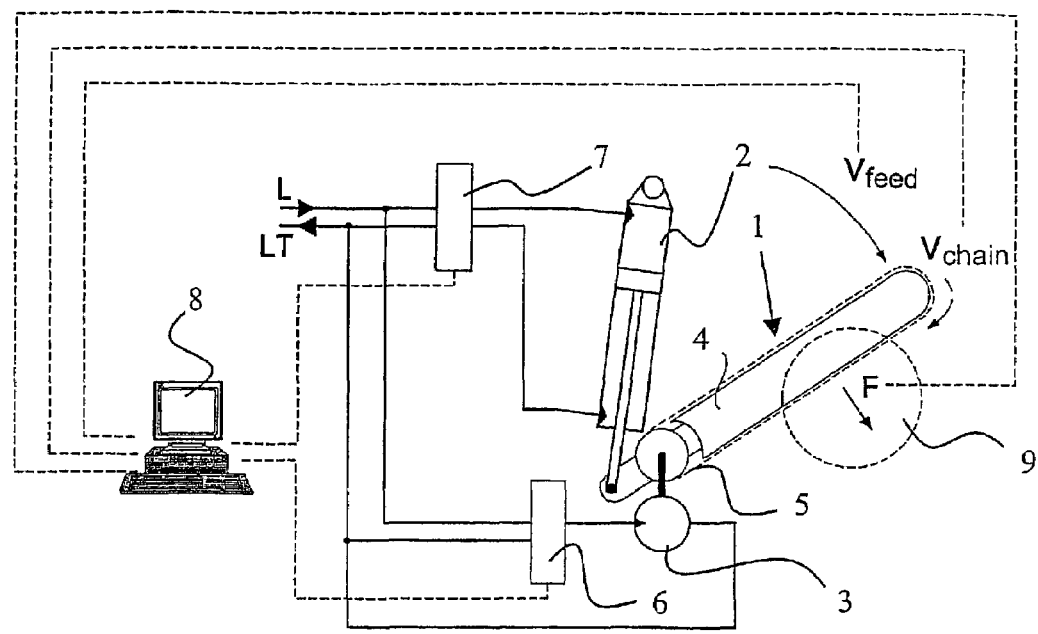
FIG. 1 shows schematically functional components of the method, and how they connect to one another.

One preferred embodiment of the method for adjusting the crosscut saw is described in the following, with reference to the above-mentioned drawing. The solution comprises structural parts indicated by like reference numerals in the drawings and in the specification.

The present method for adjusting, in particular, the crosscut saw in the harvesting head of a multi-function machine consisting of a one-grip harvester is thus based on the idea by which a feed rate $v_{feed}$ of the crosscut saw can be increased as high as possible in each sawing situation.

The embodiment shown in the attached FIGURE of the method for adjusting a feed force F and a rotating rate $v_{chain}$ of the crosscut saw 1 is only one alternative given by way of example. In this embodiment, a harvesting head mounted in connection with a multi-function machine is advantageously controlled by devices activated by a pressure medium, whereby the system most preferably uses hydraulic fluid as the pressure medium. The hydraulic components of the control system are mainly positioned in the harvesting head. The control system comprises a power transmission line L communicating with a pressure medium source, such as a hydraulic pump. In the harvesting head is arranged a crosscut saw 1 controlled by at least one actuator 2, the crosscut saw comprising a cutter chain 5 arranged on a guide bar 4 and driven by a hydraulic motor 3. From the hydraulic motor the pressure medium is supplied to a pressure medium container along a return line LT.

The hydraulic motor 3 is controlled in a manner known per se, for instance, by regulating the volume flow of the pressure medium applied thereto with a hydraulic valve 6. Naturally, it is apparent that this regulation can also be performed by regulating the return flow to the hydraulic motor, or by combining both of these regulation methods. The rotating rate $v_{chain}$ and torque of the cutter chain 5 in the crosscut saw 1 can also be adjusted by changing the displacement of the hydraulic motor, and in that case the hydraulic motor is of variable volume type. The actuator 2 controlling the guide bar 4 of the crosscut saw is also preferably hydraulically operated, such as a hydraulic cylinder, whose feed force is adjusted by a hydraulic valve 7 according to technology known per se. The control is implemented by an analogue or a digital control unit 8.

In the first step of this method, the feed rate $v_{feed}$ of the crosscut saw is determined either by measuring with measuring means or calculatorily in a manner known per se, on the whole movement range of the crosscut saw continuously or at given intervals. So the measurement can be carried out directly at a swivel of the crosscut saw by measuring angular velocity of the crosscut saw. Alternatively, the feed rate can also be determined indirectly by measuring e.g. a position, speed or acceleration of the actuator 2 controlling the crosscut saw, from which variables the feed rate can be calculated.

The present method is based on a continuous adjustment of the rotating rate $v_{chain}$ of the feed force F and/or of the cutter chain 5 of the crosscut saw 1, whereby the crosscut saw feed rate $v_{feed}$ is made as high as possible. To achieve an adjustment function of this kind, the present method employs as one alternative algorithm a simple logic, where a change in the crosscut saw feed rate $v_{feed}$ is monitored, when the feed force F of the actuator 2 controlling the crosscut saw and/or the rotating rate $v_{chain}$ of the cutter chain 5 in the crosscut saw are changed, at the same time as their magnitudes are monitored with measuring means known per se, and data on the feed rate, feed force and rotating rate are supplied to a control unit 8, using wired or wireless data transmission means.

As sawing starts, the feed force F of the actuator 2 controlling the crosscut saw 1 is set constant. As the crosscut saw penetrates into the wood 9 to be sawn, the feed force is raised stepwise and a possible change in the feed rate $v_{feed}$ of the crosscut saw is simultaneously monitored all the time on the basis of the data received in the control unit 8 from the measuring means.

In one embodiment of the present method, for each new feed force value F', the control unit 8 determines the effect of the new feed force on the feed rate of the crosscut saw. If the obtained feed rate difference $v_{feed}'-v_{feed}=\delta v>0$, the adjustment of the feed force is continued in the same direction. The feed force is increased until the feed rate stops rising, i.e. the change in $\delta v$ is insignificant. As the unit detects that the feed rate does no longer rise by increasing the feed force, the rotating rate $v_{chain}$ of the cutter chain 5 in the crosscut saw will be changed. At the same time, the adjustment process is restarted from the beginning by changing the feed force F of the actuator controlling the crosscut saw until a new maximum value is found for the feed rate $v_{feed}$.

On the other hand, if the feed rate difference, obtained by a change in the feed force F, $v_{feed}'-v_{feed}=\delta v \leq 0$, the feed force will be adjusted in the opposite direction until $\delta v$ is again positive. Thereafter, the rotating rate $v_{chain}$ of the cutter chain 5 in the crosscut saw will be changed and the adjustment process is restarted from the beginning.

It is also possible to adjust both the feed force F of the crosscut saw 1 and the rotating rate $v_{chain}$ of the cutter chain 5, alternately or at given intervals, and to monitor the effect of the adjustment measures on the saw feed rate in the above-described manner. Conventionally, the rotating rate of the cutter chain is given the maximum value, which means that on reaching this value, only the feed force of the crosscut saw is adjusted.

The changing of the feed force F and the feed rate $v_{feed}$ is continued until the whole wood 9 to be cut is sawn up.

The above-described method is only one alternative embodiment of the present method, which, by monitoring the change in the feed rate $v_{feed}$ of the crosscut saw 1, tries to find such a combination for the feed force F of the actuator 2 controlling the crosscut saw 1 and the rotating rate $v_{chain}$ of the cutter chain 5 that enables the highest possible feed rate of the crosscut saw.

The adjustment of the feed force F can be back fed, whereby the feed force is adjusted in a manner known per se with a particular adjuster such that the feed force is measured and the feed force base value is provided by a higher-level controller. The adjustment of the rotating rate $v_{chain}$ can also be implemented in the same manner by using a particular lower-level controller. The method can employ various optimization algorithms that are not described separately herein.

Because the sawing of the last third of the wood/trunk, in particular, has proved to be very important, the present sawing method also provides a possibility to increase the efficiency of the crosscut saw by driving the crosscut saw at overspeed. Using overspeed in sawing tends to shorten the service life of the crosscut saw, but because this kind of driving is of short duration, its utilization for particularly optimizing the final stage of sawing can be justified, and it is also economically feasible.

It should be understood that the above description and the relating figures are only intended to illustrate the present method for adjusting a crosscut saw. Hence, the solution is not restricted only to the above-described embodiment or the one disclosed in the claims, but it is apparent to a person skilled in the art that the invention can be varied and modified in a variety of ways within the scope of the inventive idea disclosed in the attached claims.

What is claimed is:

1. A method for adjusting a feed rate of a crosscut saw (1) during crosscutting; by controlling a crosscut saw feed force (F) and/or a rotating rate ($v_{chain}$) of a cutter chain (5) revolving around a guide bar (4) of the crosscut saw, the method comprising following steps:
    measuring the present feed rate ($v_{feed}$) of the crosscut saw (1),
    adjusting the feed force (F) of an actuator (2) controlling the crosscut saw and/or the rotating rate ($v_{chain}$) of the cutter chain (5) revolving around the guide bar (4),
    determining an effect of the performed adjustment on the present feed rate of the crosscut saw, and
    concluding a next adjustment to be performed from the size of the change ($\delta v$) in the feed rate for continuously achieving a highest possible feed rate and continuing the adjustments until the wood is cut.

2. A method as claimed in claim 1, wherein
    the feed force (F) of the actuator (2) controlling the crosscut saw are slightly adjusted whereafter the effect of a new feed force (F') on the feed rate ($V_{feed}$) is compared,
    if the difference of consecutive feed rate measurement results ($\delta v$)>0, the adjustment of the feed force is continued in the same direction,
    if the difference of consecutive feed rate measurement results ($\delta v$)≦0, the feed force will be adjusted in the opposite direction, such that
    the feed force of the actuator (2) controlling the crosscut saw is adjusted until the wood is cut.

3. A method as claimed in claim 2, wherein when the difference ($\delta v$) between the feed rates obtained by adjusting the feed force (F) of the actuator (2) controlling the crosscut saw is substantially insignificant in magnitude, the rotating rate ($v_{chain}$) of the cutter chain (5) revolving around the guide bar (4) will be adjusted.

4. A method as claimed in claim 1, wherein the feed rate ($v_{feed}$) of the crosscut saw (1) is measured at the crosscut saw swivel by measuring an angular velocity of the crosscut saw.

5. A method as claimed in claim 1, wherein the feed rate ($v_{feed}$) of the crosscut saw (1) is determined calculatorily by measuring a change in motion of the actuator (2) controlling the crosscut saw.

6. A method as claimed in claim 1, wherein a pressure medium flow controlling the actuator (2) of the crosscut saw (1) is back fed.

7. A method as claimed in claim 3, wherein a pressure medium flow controlling the cutter chain (5) is back fed.

8. A method as claimed in claim 1, wherein the rotating rate and torque of the cutter chain (5) in the crosscut saw (1) are adjusted by changing the displacement of a hydraulic motor (3) driving the crosscut saw.

9. A method as claimed in claim 1, wherein an analogue control unit (8) is arranged for controlling the adjustment of the crosscut saw (1).

10. A method as claimed in claim 1, wherein a digital control unit (8) is arranged for controlling the adjustment of the crosscut saw (1).

11. An arrangement for adjusting a feed rate of a crosscut saw (1) during cutting,
    the crosscut saw comprising a guide bar (4) that cuts wood at a feed rate ($v_{feed}$) produced by at least one actuator (2) controlling movement of the guide bar, and the crosscut saw further comprising a cutter chain (5) revolving around the guide bar at a rotating rate ($v_{chain}$),
    the crosscut saw (1) furthermore comprising means for measuring the feed rate ($v_{feed}$) of the guide bar, rotating rate ($v_{chain}$) of the cutter chain and feed force (F) of the guide bar, and the measurement data is arranged to be transferred to a control unit (8) by utilizing data transmission means,
    the control unit being arranged to conclude adjustment measures from the difference of consecutive feed rate measurement data such that
    the control unit is arranged to adjust the feed force (F) of the actuator (2) for variably controlling the speed of the crosscut saw and/or the rotating rate ($v_{chain}$) of the cutter chain (5) revolving around the guide bar (4) on the basis of the received and concluded data.

12. The method of claim 1, wherein,
    said adjusting the feed force step adjusts the feed force of the actuator controlling movement of the crosscut saw.

13. The method of claim 1, wherein,
    said adjusting the feed force step adjusts the feed force of the actuator controlling the rotating rate of the cutter chain revolving around the guide bar.

14. The method of claim 1, wherein,
    said adjusting step adjusts i) the feed force of the actuator controlling movement of the crosscut saw and ii) the rotating rate of the cutter chain revolving around the guide bar.

15. A method of adjusting a feed rate of a crosscut saw during crosscutting of wood, comprising the steps of:
    a) measuring a feed rate ($v_{feed}$) of the crosscut saw (1);
    b) after said measuring step a), adjusting one of i) a turning movement speed of a guide bar of the crosscut saw to adjust a feed force (F) and ii) a rotating rate ($v_{chain}$) of a cutter chain (5) around a guide bar of the crosscut saw to adjust a rotating speed of the cutter chain;

c) after said adjusting step b), determining a change ($\delta v$) in the feed rate resulting from said adjusting step; and d) repeatedly repeating steps a)–c) during the crosscutting of wood, wherein, each adjustment made in said adjusting step b) is based on a last determined change in the feed rate during a last determining step c), said each adjustment directed to achieve a highest possible feed rate by iteratively adjusting at least one of i) the turning movement speed of the saw blade and ii) the rotating speed of the cutter chain.

16. The method of claim 15, wherein, the step of monitoring the feed rate of the crosscut saw comprises:

at least one of monitoring i) the feed force (F) of the crosscut saw and ii) the rotating rate ($v_{chain}$) of the cutter chain.

17. The method of claim 15, wherein, the step of monitoring the feed rate of the crosscut saw comprises:

monitoring i) the feed force (F) of the crosscut saw and ii) the rotating rate ($v_{chain}$) of the cutter chain.

18. The method of claim 16, wherein, said adjusting step b) adjusts a feed force of an actuator controlling the turning movement speed of the guide bar.

19. The method of claim 16, wherein, said adjusting step b) adjusts the rotating rate of the cutter chain.

20. The method of claim 17, wherein, said adjusting step b) adjusts i) an actuator controlling the turning movement speed of the guide bare, and ii) the rotating rate of the cutter chain.

* * * * *